US012568433B2

(12) United States Patent
Hong

(10) Patent No.: US 12,568,433 B2
(45) Date of Patent: Mar. 3, 2026

(54) ACCESS METHOD, ACCESS APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 498 days.

(21) Appl. No.: 18/009,222

(22) PCT Filed: Jun. 10, 2020

(86) PCT No.: PCT/CN2020/095396
§ 371 (c)(1),
(2) Date: Dec. 8, 2022

(87) PCT Pub. No.: WO2021/248371
PCT Pub. Date: Dec. 16, 2021

(65) Prior Publication Data
US 2023/0217366 A1 Jul. 6, 2023

(51) Int. Cl.
*H04W 48/20* (2009.01)
*H04W 8/22* (2009.01)
*H04W 76/20* (2018.01)

(52) U.S. Cl.
CPC ............. *H04W 48/20* (2013.01); *H04W 8/22* (2013.01); *H04W 76/20* (2018.02)

(58) Field of Classification Search
CPC ........ H04W 48/20; H04W 76/20; H04W 8/22
See application file for complete search history.

(56) References Cited

U.S. PATENT DOCUMENTS

| | | | |
|---|---|---|---|
| 2017/0208455 A1 | 7/2017 | Au et al. | |
| 2019/0104432 A1 | 4/2019 | Dhanapal et al. | |
| 2021/0019657 A1* | 1/2021 | Wu ................... | G06Q 10/0635 |
| 2022/0342706 A1 | 10/2022 | Hong | |

FOREIGN PATENT DOCUMENTS

| CN | 101646223 | A | | 2/2010 | | |
|---|---|---|---|---|---|---|
| CN | 102204217 | A | | 9/2011 | | |
| CN | 106709917 | A | * | 5/2017 | | |
| CN | 108057249 | A | * | 5/2018 | ............. | A63F 13/79 |
| CN | 108401514 | A | | 8/2018 | | |
| CN | 109309915 | A | | 2/2019 | | |
| CN | 110659053 | A | * | 1/2020 | ............. | G06F 8/65 |
| CN | 110730954 | A | | 1/2020 | | |

(Continued)

OTHER PUBLICATIONS

ISA State Intellectual Property Office of the People's Republic of China, International Search Report Issued in Application No. PCT/CN2020/095396, Feb. 25, 2021, WIPO, 4 pages.

(Continued)

*Primary Examiner* — Saad A. Waqas

(74) *Attorney, Agent, or Firm* — Volpe Koenig

(57) ABSTRACT

An access method. The access method includes: acquiring an AI model type supported by each of one or more network devices; and selecting, according to the AI model type supported by each of the one or more network devices, a network device that corresponds to the AI model type matching an AI model type supported by a terminal for access.

14 Claims, 6 Drawing Sheets

S31
Send an AI model type supported by the terminal to each of one or more network devices S32
Acquire the AI model type supported by each of the one or more network devices S33
Select a network device that corresponds to an AI model type matching the AI model type supported by the terminal for access according to the AI model type supported by each of the one or more network device

(56)             References Cited

FOREIGN PATENT DOCUMENTS

| | | | | | |
|---|---|---|---|---|---|
| CN | 110785984 A | * | 2/2020 | ............ | H04L 67/10 |
| CN | 111262667 A | | 6/2020 | | |
| JP | 2020064564 A | * | 4/2020 | | |
| WO | WO-2019031258 A1 | * | 2/2019 | ............ | H04L 65/65 |
| WO | WO-2020042112 A1 | * | 3/2020 | ............ | G06F 11/36 |
| WO | 2020/080989 A1 | | 4/2020 | | |

OTHER PUBLICATIONS

State Intellectual Property Office of the People's Republic of China, Office Action and Search Report Issued in Application No. 2020800012549, Mar. 30, 2022, 16 pages. (Submitted with Machine/Partial Translation).

State Intellectual Property Office of the People's Republic of China, Office Action and Search Report Issued in Application No. 2020800012549, Nov. 21, 2022, 12 pages. (Submitted with Machine/Partial Translation).

Huawei et al., "Support for services using Artificial Intelligent", 3GPP TSG-SA WG1 Meeting #83, S1-182546, West Palm Beach, Florida, Aug. 20-24, 2018, 2 pages.

Dan Xu et al., "Research on AI based 5G network slice management technology", 5G Slicing Technology and its Applications, Jan. 6, 2020, 7 pages.

OPPO et al., "SID Proposal: Study on AI/ML Model Transfer in 5G3", 3GPP TSG-SA WG1 Meeting #88 S1-193531, Reno, USA, Nov. 18-22, 2019, 3 pages.

Huawei et al., "IMS support for services using AI (voiceprint)", 3GPP TSG-SA WG1 Meeting #82 S1-181437, Dubrovnik, Croatia, May 7-11, 2018, 2 pages.

European Patent Office, Extended European Search Report Issued in Application No. 20939544.1, Feb. 2, 2024, Germany, 9 pages.

India Office Action issued on Feb. 7, 2023 for Indian Patent Application No. 202247074647.

ISA State Intellectual Property Office of the People's Republic of China, Written Opinion of the International Searching Authority Issued Feb. 25, 2021 for PCT International Application No. PCT/CN2020/095396.

Intellectual property India, Hearing Notice in Reference of Application No. 202247074647, Apr. 30, 2025, 3 pages.

* cited by examiner

S11

Acquire an AI model type supported by each of one or more network devices

S12

Select a network device that corresponds to the AI model type matching an AI model type supported by a terminal for access according to the AI model type supported by each of the one or more network devices

S21

Send an AI model type supported by the network device

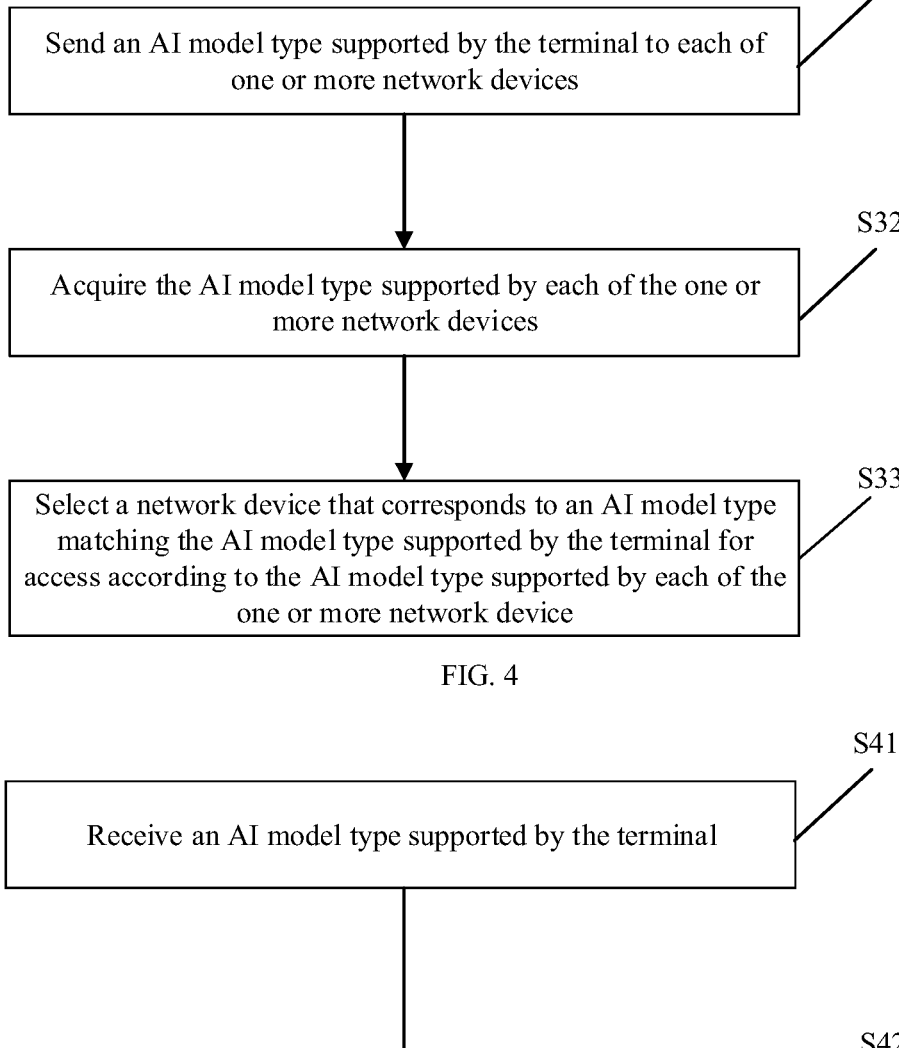

S31

Send an AI model type supported by the terminal to each of one or more network devices

S32

Acquire the AI model type supported by each of the one or more network devices

S33

Select a network device that corresponds to an AI model type matching the AI model type supported by the terminal for access according to the AI model type supported by each of the one or more network device

Receive an AI model type supported by the terminal

S42

Send the AI model type supported by the network device

FIG. 5

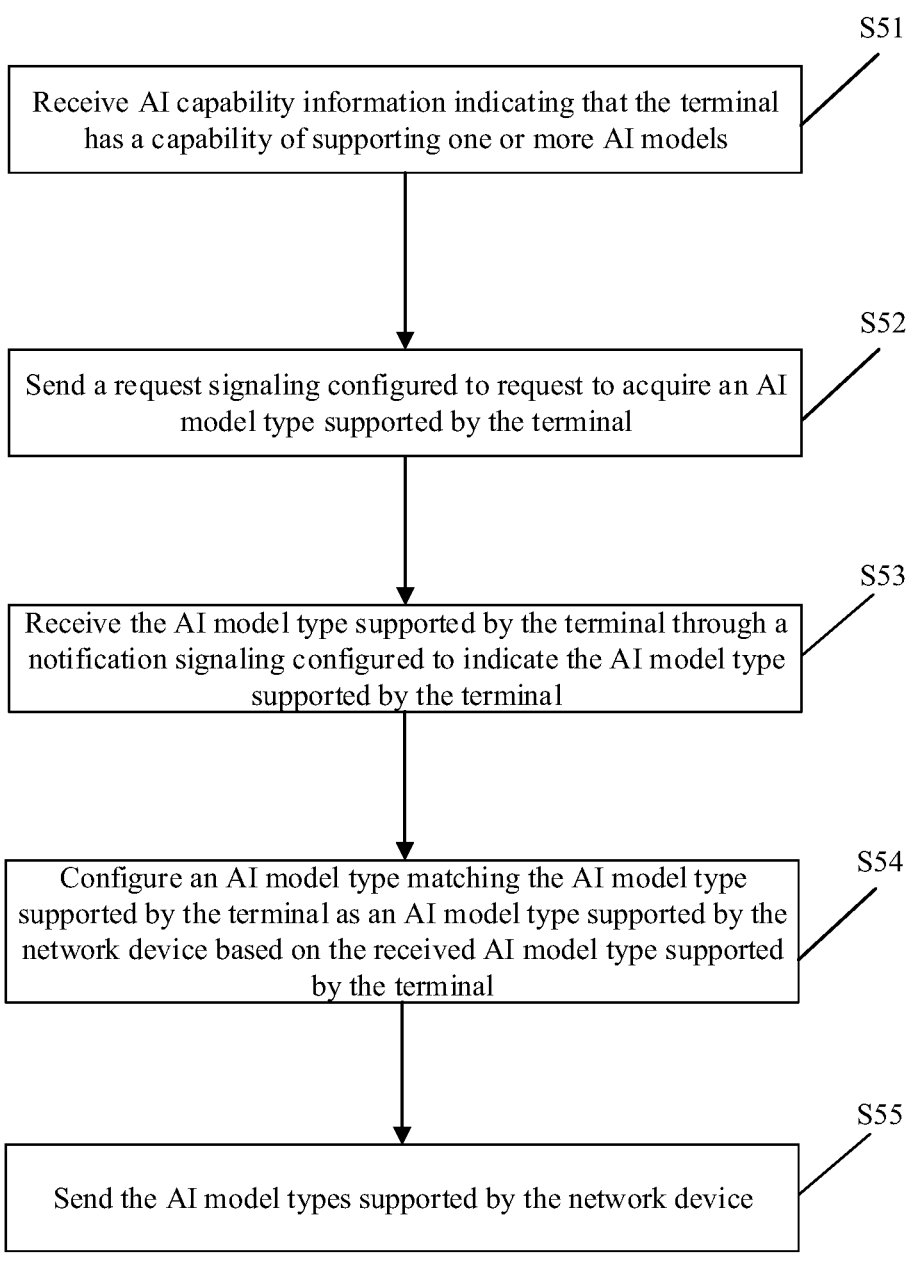

S51

Receive AI capability information indicating that the terminal has a capability of supporting one or more AI models

S52

Send a request signaling configured to request to acquire an AI model type supported by the terminal

S53

Receive the AI model type supported by the terminal through a notification signaling configured to indicate the AI model type supported by the terminal

S54

Configure an AI model type matching the AI model type supported by the terminal as an AI model type supported by the network device based on the received AI model type supported by the terminal

S55

Send the AI model types supported by the network device

Memory

Processing
Component

Communication
Component

816

806

Power Supply
Component

Processor

820

Multimedia
Component

808

Sensor
Component

814

810

Audio
Component

Input/Output interface

812

ACCESS METHOD, ACCESS APPARATUS, AND STORAGE MEDIUM

CROSS-REFERENCE TO RELATED APPLICATION

This application is the U.S. national phase application of International Application No. PCT/CN2020/095396, filed on Jun. 10, 2020, the disclosure of which is incorporated herein by reference in its entirety for all purposes.

TECHNICAL FIELD

The present disclosure relates to the field of communication technologies, and in particular, relates to an access method, an access apparatus, and a storage medium.

BACKGROUND

As wireless communication technologies and computer technologies progress, artificial intelligence (AI) plays an increasing role on a terminal side. In related arts, the AI has been applied in many fields such as camera, voice, and security in a terminal such as an intelligent phone to enhance user experiences. With 5G maturing and being commercialized, characteristics of a 5G network, such as high-speed, high-reliability, and low-latency, bring an opportunity for a terminal with an AI capability to intelligently collaborate with a device with the AI capability on the cloud side to achieve more functions and make the user experience better. For example, in an era of 5G, the AI applied to the terminal may achieve more seamless collaboration with the cloud side, more natural interaction modes, and stronger interconnections and collaborations between the intelligence terminals.

The more powerful that a processing capability of the terminal is, then the more the data, the faster feedback, and the decision-making that the terminal with the AI capability can provide and process. However, a network device and the terminal cannot share AI capabilities in the related arts. For example, the network device cannot mobilize the AI capability of the terminal, while the terminal cannot mobilize the AI capability of the network device.

SUMMARY

The present disclosure provides an access method, an access apparatus, and a storage medium.

According to a first aspect of the embodiments of the present disclosure, an access method is provided. The method includes:

acquiring an AI model type supported by each of one or more network devices; and selecting, according to the AI model type supported by each of the one or more network devices, a network device that corresponds to the AI model type matching an AI model type supported by a terminal for access.

According to a second aspect of the embodiments of the present disclosure, an access method is provided. The method includes:

sending an AI model type supported by a network device.

According to a third aspect of the embodiments of the present disclosure, an access apparatus is provided and includes:

one or more processors; and a memory for storing instructions executable by the one or more processors.

The one or more processors are configured to perform the access method described in the first aspect or any one of the embodiments in the first aspect.

It should be understood that the above general description and the following detailed description are only illustrative and explanatory, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, explain the principles of the disclosure.

FIG. 4 illustrates a flowchart of an access method according to an example.

FIG. 5 illustrates a flowchart of an access method according to an example.

FIG. 6 illustrates a flowchart of an access method according to an example.

DETAILED DESCRIPTION OF THE EMBODIMENTS

Figures 1, 2, 3:
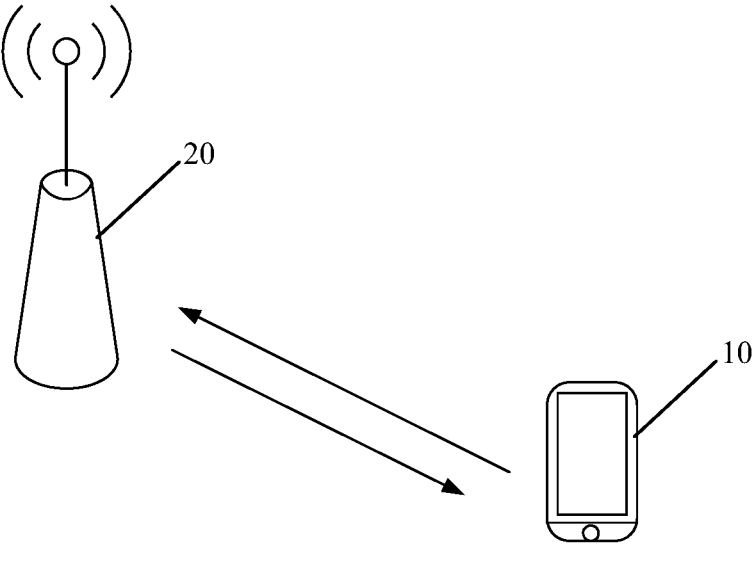
FIG. 1 illustrates a structural diagram of a wireless communication system according to an example.
FIG. 2 illustrates a flowchart of an access method according to an example.
FIG. 3 illustrates a flowchart of an access method according to an example.

Exemplary embodiments will be described in detail herein, with the examples thereof expressed in the drawings. Where the following descriptions involve the drawings, like numerals in different drawings refer to like or similar elements unless otherwise indicated. The implementations described in the following examples do not represent all implementations consistent with the present disclosure. Rather, they are merely examples of apparatuses and methods consistent with some aspects of the present disclosure as detailed in the appended claims.

The access methods provided by the examples of the present disclosure may be applicable to a wireless communication system illustrated in FIG. 1. As illustrated in FIG. 1, the wireless communication system includes a terminal 10 and a network device 20. Information is sent and received between the terminal 10 and the network device 20 through wireless resources.

It should be understood that the wireless communication system illustrated in FIG. 1 is only for schematic illustration. The wireless communication system may also include other network devices, such as a core network device, a wireless relay device and a wireless backhaul device, which are not shown in FIG. 1. Neither the number of the network devices nor the number of the terminals included in the wireless communication system is limited by the examples of the present disclosure.

It should be further understood that the wireless communication system in the example of the present disclosure means a network that provides wireless communication functions. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to different factors of the network, such as capacity, speed, and delay, the network may be classified as a 2G (second generation) network, a 3G (third generation) network, a 4G (fourth generation) network or a future evolution network, e.g., a 5G (fifth generation) network. The 5G network may also be called a new radio (NR) network. For the convenience of description, the wireless communication network is sometimes referred to as a network for short in the disclosure.

Moreover, the network device involved in the present disclosure may also be referred to as a wireless access network device. The wireless access network device may include a base station, an evolved node B, a femtocell, an access point (AP) in a wireless fidelity (WiFi) system, a wireless relay node, a wireless backhaul node, a transmission point (TP), or a transmission and reception point (TRP), etc. The wireless access network device may also include a gNB in an NR system, a component constituting the base station, or a part thereof. For a vehicle-to-everything (V2X) communication system, the network device may also include a vehicle-mounted device. It should be understood that the specific technology and specific form adopted by the network device are not limited by the examples of the present disclosure.

Moreover, the terminal involved in the present disclosure may also be referred to as a terminal equipment, a user equipment (UE), a mobile station (MS), a mobile terminal (MT), etc. The terminal means a device that provides voice and/or data connectivity for a user, such as a handheld device or a vehicle-mounted device with a wireless connection function. One or more examples of the terminal include a smart phone, a pocket personal computer (PPC), a handheld computer, a personal digital assistant (PDA), a notebook computer, a tablet computer, a wearable device, or a vehicle-mounted device, etc. For a vehicle-to-everything (V2X) communication system, the terminal device may also include a vehicle-mounted device. It should be understood that the specific technology and specific form adopted by the terminal are not limited by the examples of the present disclosure.

The terminal and the network device involved in the examples of the present disclosure both have an AI capability. The terminal with the AI capability can quickly respond to requirements from the user and quickly display information on processed images, videos, voices, and texts to the user in a low-power and low-cost manner, which is suitable for completing AI inference tasks. The terminal with the AI capability may have an opportunity to intelligently collaborate with a device with the AI capability on a cloud side, to achieve more functions and provide the user with a better experience. The device with the AI capability on the cloud side may be used to achieve a data aggregation for multiple terminals. The device with the AI capability on the cloud side is suitable for completing AI model training tasks due to its advantages in data throughput, processing speed, etc. Therefore, an AI processing mode based on a cloud-side collaboration plays an important role in some aspects, such as model training and data reasoning.

By applying AI in the wireless communication, the commands from the user are initially processed by a smart chip of the terminal, and then a cloud-side processing result is fed back by a 5G network to the user through interactions in real time between the terminal and a cloud-side device, which can improve a data processing capability and effectively reduce a time delay.

An example of the present disclosure provides an access method. In particular, a terminal with the AI capability selects, according to an AI model type supported by each of one or more network devices, a network device that corresponds to the AI model type matching an AI model type supported by the terminal for access, which enables the terminal with the AI capability to select a wireless network matching the AI capability of the terminal itself for access, thereby achieving stronger interconnections and collaborations between the terminal with the AI capability and the network device with the AI capability. Therefore, the terminal with the AI capability can make faster feedback and decisions by utilizing the AI capability of the network device, and a utilizing efficiency of the AI capabilities of the terminal and the network device is improved, which improves communication efficiency.

FIG. 2 illustrates a flowchart of an access method according to an example. As illustrated in FIG. 2, the access method is applicable to a terminal and includes the following steps.

At step S11, an AI model type supported by each of one or more network devices is acquired.

In the example of the present disclosure, the AI model type supported by each of the one or more network device may include an actual AI model type supported by the network device, and/or an AI training model supported by the network device, and/or an AI inference model type supported by the network device.

At step S12, a network device that corresponds to the AI model type matching an AI model type supported by a terminal is selected for access according to the AI model type supported by each of the one or more network devices.

In the example of the present disclosure, after acquiring the AI model type supported by each of the one or more network devices, the terminal may select the AI model type matching the AI model type supported by the terminal according to and from one or more acquired AI model types supported by the network devices, and thereby select the network device that corresponds to the AI model type matching the AI model type supported by the terminal for access. That is, the terminal selects a wireless network that matches the AI capability of the terminal itself for access, thereby improving an efficiency of utilizing the AI.

In one implementation, the AI model type supported by each of the one or more network devices may be configured by the network device and sent to the terminal.

FIG. 3 illustrates a flowchart of an access method according to an example. As illustrated in FIG. 3, the access method is applicable to a network device and includes the following steps.

At step S21, an AI model type supported by the network device is sent.

In the example of the present disclosure, the network device may predefine the AI model type supported by itself based on the AI capability it supports, such as an actual AI model type it supports, and/or an AI training model supported by the network device, and/or an AI inference model type supported by the network device.

In the example of the present disclosure, the network device may broadcast the AI model type supported by the network device to a terminal in system information. Alternatively or additionally, the network device may send the AI model type supported by the network device through a unicast signaling to the terminal with the AI capability that is to access the network device. When the network device sends the AI model type it supports through the unicast signaling, a radio resource control reconfiguration (RR-CReconfiguration) signaling, for example, may be adopted to send the AI model type supported by the network device to the terminal that is to access the network device.

The network device broadcasts the AI model type supported by the network device in the system information, and thus, the terminal that receives the system information broadcast by the network device may acquire the AI model type supported by the network device through the received system information.

In the case that the AI model type supported by the network device is sent through the unicast signaling to the terminal that is to access the network device, the terminal acquires the AI model type supported by the network device through the unicast signaling. In the example of the present disclosure, for the convenience of description, the unicast signaling for sending the AI model type supported by the network device is referred to as a first unicast signaling.

Moreover, the AI model type supported by the network device in the example of the present disclosure may include one AI model type or a plurality of AI model types. In order to mark the AI model type supported by the network device, in one implementation, the AI model type supported by the network device may be indicated by an integer value defined in advance, that is, it is negotiated in advance which integer value represents which model type. In other words, the AI model types are represented by the integer values. Different integer values correspond to different AI model types. When the network device sends the AI model type supported by the network device to the terminal, the corresponding integer value is adopted to indicate the AI model type supported by the network device. The terminal receives the integer value sent by the network device, and based on a predefined correspondence between the integer values and the AI model types, the terminal may determine the AI model type supported by the network device.

In one implementation, the AI model type supported by the network device may be indicated by a value of a bit field defined in advance, that is, it is defined in advance that the AI model types are represented by the values of the bit field, and a correspondence between the values of the bit field and the AI model types are negotiated, in which different values of the bit field correspond to different AI model types. As an example, different values of three bits are defined to represent the AI model types supported by the network device. For example, 000 represents AI model type #1 supported by the network device, 001 represents AI model type #2 supported by the network device, and so on. When the network device sends the AI model type supported by the network device to the terminal, the corresponding value of the bit field is adopted to indicate the AI model type supported by the network device. The terminal receives the value of the bit field sent by the network device, and based on the predefined correspondence between the values of the bit field and the AI model types, the terminal may determine the AI model type supported by the network device.

In the example of the present disclosure, after receiving the AI model type sent by the network device, the terminal may select the network device that matches the AI model type supported by the terminal itself for access.

When determining that there are a plurality of AI model types supported by the terminal itself during selecting the matched AI model type from the AI model types supported by the network device, the terminal may select one of the AI model types it supports based on a service to be performed by the terminal.

It should be understood that, in the example of the present disclosure, when the terminal does not determine the AI model type matching the AI model type supported by the terminal itself from the AI model types sent by one or more network devices, a conventional access mode may be adopted, without considering the AI capability of the terminal.

Moreover, in the example of the present disclosure, to further avoid that the terminal cannot find the AI model type supported by the terminal itself from the AI model types sent by the one or more network devices and to ensure that the terminal supporting the AI capability performs the aforementioned communication process, the terminal may send an AI model type supported by the terminal to the one or more network devices. The AI model type supported by the terminal, sent by the terminal to the one or more network devices, may include an actual AI model type supported by the terminal, and/or an AI training model supported by the terminal, and/or an AI inference model type supported by the terminal.

FIG. 4 illustrates a flowchart of an access method according to an example. As illustrated in FIG. 4, the access method is applicable to a terminal and includes the following steps.

At step S31, an AI model type supported by the terminal are sent to each of one or more network devices.

In the example of the present disclosure, when being sent by the terminal to each of the one or more network devices, the AI model type supported by the terminal may be sent through a unicast signaling. For the convenience of description, the unicast signaling for sending the AI model type supported by the terminal is referred to as a second unicast signaling in the example of the present disclosure.

When the terminal sends the AI model type supported by the terminal to each of the one or more network devices through the second unicast signaling, the second unicast signaling may be a terminal capability indication signaling or a radio resource control creation completion (RRCSetupComplete) signaling.

Each of the one or more network devices may receive the AI model type supported by the terminal through the second unicast signaling.

Further, after receiving the AI model type supported by the terminal, each of the one or more network devices may configure an AI model type that match the AI model type supported by the terminal as the AI model type supported by the network device, to ensure that the terminal can select an AI model type matching the AI model type supported by the terminal.

When configuring the AI model type that matches the AI model type supported by the terminal, the network device may send it to the terminal.

At step S32, the AI model type supported by each of the one or more network devices are acquired.

At step S33, a network device corresponding to an AI model type matching the AI model type supported by the terminal is selected for access according to the AI model type supported by each of the one or more network devices.

FIG. 5 illustrates a flowchart of an access method according to an example. As illustrated in FIG. 5, the access method is applicable to a network device and includes the following steps.

At step S41, an AI model type supported by the terminal is received.

In the example of the present disclosure, the network device may receive the AI model type supported by the terminal through a second unicast signaling.

Further, after receiving the AI model type supported by the terminal, the network device may configure an AI model type that matches the AI model type supported by the terminal as the AI model type supported by the network device, to ensure that the terminal can select an AI model type matching the AI model type supported by the terminal.

When configuring the AI model type that matches the AI model type supported by the terminal, the network device may send it to the terminal.

At step S42, the AI model type supported by the network device are sent.

Based on the received AI model type supported by the terminal, the network device may configure the AI model type matching the AI model type supported by the terminal as the AI model type supported by the network device.

In another implementation of the example of the present disclosure, when attempting to access a network device, the terminal with the AI capability may send to each of one or more network devices AI capability information that the terminal can support one or more AI models. For example, the terminal with the AI capability sends to the network device the AI capability information indicating that the terminal supports an AI model/, an AI training model, and/or an AI inference model type supported by the terminal. When the network device wants to know the AI model and/or the AI training model and/or the AI inference model supported by the terminal with the AI capability, the network device sends a request signaling to the terminal with the AI capability. The request signaling is configured to request the acquisition of the AI model type supported by the terminal. The request signaling may include a terminal information request (UEInformationRequest) signaling. After receiving the request signaling, the terminal with the AI capability informs the network device of the specific information on the AI model/, the AI training model, and/or the AI inference model it supports. That is, the terminal with the AI capability sends, through a notification signaling, the AI model type supported by the terminal to the network device. The notification signaling is configured to indicate the AI model type supported by the terminal. The notification signaling may include a terminal information response (UEInformationResponse) signaling.

FIG. 6 illustrates a flowchart of an access method according to an example. As illustrated in FIG. 6, the access method is applicable to a network device and includes the following steps.

At step S51, AI capability information is received. The AI capability information indicates that the terminal can support one or more AI models.

At step S52, a request signaling is sent. The request signaling is configured to request the acquisition of an AI model type supported by the terminal.

At step S53, the AI model type supported by the terminal is received through a notification signaling. The notification signaling is configured to indicate the AI model type supported by the terminal.

At step S54, an AI model type matching the AI model type supported by the terminal is configured as an AI model type supported by the network device based on the received AI model type supported by the terminal.

At step S55, the AI model types supported by the network device are sent.

Figure 7:
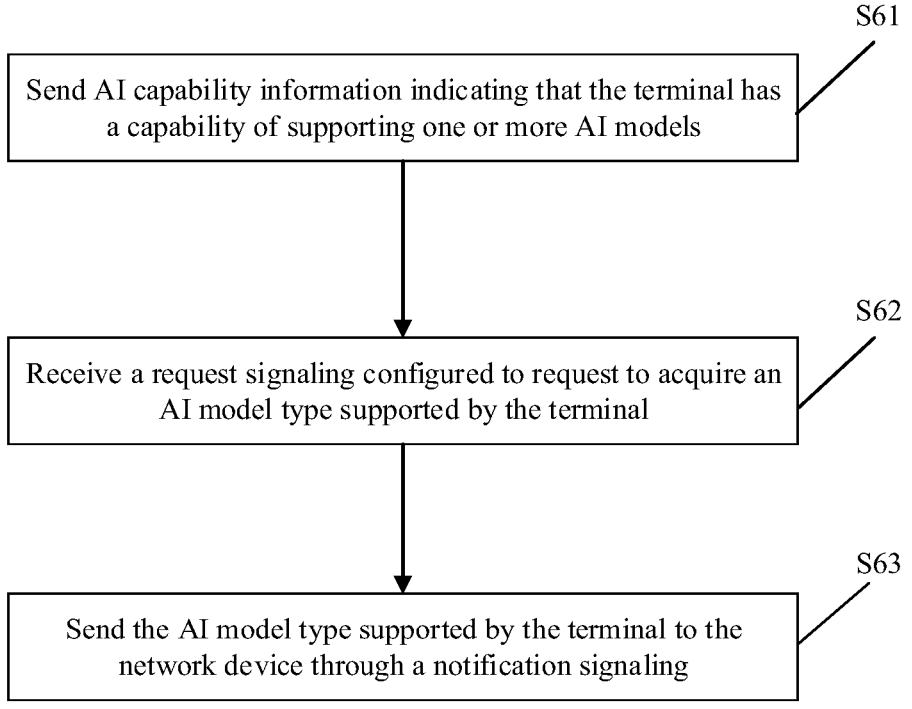
FIG. 7 illustrates a flowchart of an access method according to an example.

FIG. 7 illustrates a flowchart of an access method according to an example. As illustrated in FIG. 7, the access method is applicable to a terminal and includes the following steps.

At step S61, AI capability information is sent. The AI capability information indicates that the terminal can support one or more AI models.

At step S62, a request signaling is received. The request signaling is configured to request the acquisition of an AI model type supported by the terminal.

In response to determining that the request signaling sent by a network device is received, the terminal sends an AI model type supported by the terminal to the network device. When receiving the request signaling sent by the network device, the terminal sends the AI model type supported by the terminal.

At step S63, the AI model type supported by the terminal is sent to the network device through a notification signaling.

The terminal may send the AI model type supported by the terminal to the network device through the notification signaling. The notification signaling is configured to indicate the AI model type supported by the terminal.

According to the access methods provided by the examples of the present disclosure, each of one or more network devices with the AI capability configures and sends the AI model type it supports, the terminal with the AI capability acquires the AI model type supported by each of the one or more network devices, and selects a network device that corresponds to the AI model type matching an AI model type supported by the terminal based on the AI model types supported by the one or more network devices for access, which enables the terminal with the AI capability to select a wireless network matching the AI capability of the terminal for access, thereby improving a utilizing efficiency of the AI capabilities of the terminal and the network device.

The access methods provided in the examples of the present disclosure are applicable to an interaction process between the terminal and the network device. The interaction process between the terminal and the network device for achieving access based on the AI model type may make reference to the relevant description of the above examples and is not repeated here.

An example of the present disclosure also provides an access apparatus based on the same conception.

It should be understood that the access apparatus provided by the example of the present disclosure includes corresponding hardware structures and/or corresponding software modules for performing various functions, to implement the above functions. By combining with units and algorithm steps disclosed in the example of the present disclosure, the example of the present disclosure may be implemented in hardware or in a combinational form of hardware and computer software. Whether to perform a certain function in hardware or software-driven hardware is dependent on specific applications of a technical solution and design constraints. Those skilled in the art may adopt different approaches to implement the described functions for each specific application, which should not be considered beyond the scope of the technical solution of the example of the present disclosure.

Figure 8:
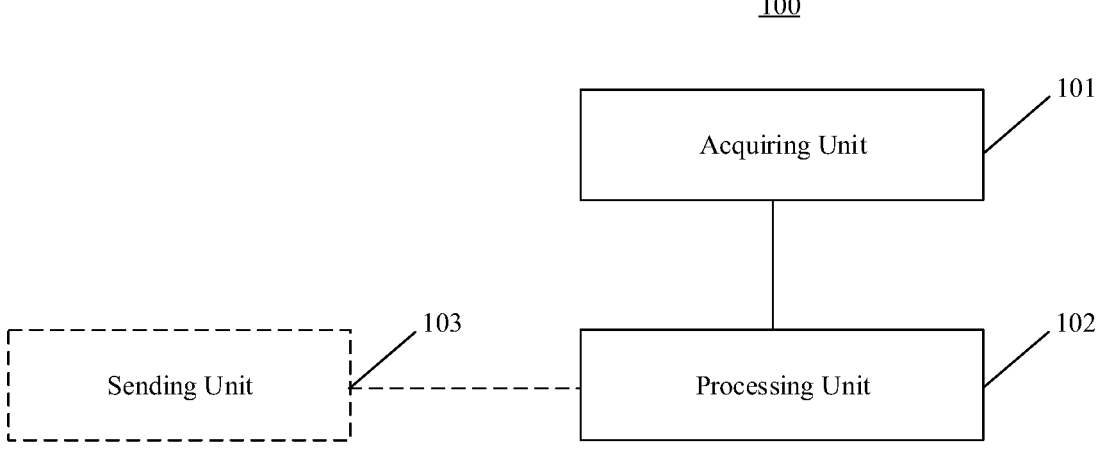
FIG. 8 illustrates a block diagram of an access apparatus according to an example.

FIG. 8 illustrates a block diagram of an access apparatus according to an example. As illustrated in FIG. 8, the access apparatus 100 includes an acquiring unit 101 and a processing unit 102.

The acquiring unit 101 is configured to acquire an AI model type supported by each of one or more network devices. The processing unit 102 is configured to select, according to one or more acquired AI model types, a network device that corresponds to the AI model type matching an AI model type supported by a terminal for access.

Alternatively or additionally, the acquiring unit 101 acquires the AI model type supported by each of the one or more network devices through system information broadcast by the network device.

Alternatively or additionally, the acquiring unit 101 acquires the AI model type supported by each of the one or more network devices through a first unicast signaling Alternatively or additionally, the first unicast signaling includes a radio resource control reconfiguration signaling.

Alternatively or additionally, the AI model type is represented by an integer value, where different integer values correspond to different AI model types.

Alternatively or additionally, the AI model type is represented by a value of a bit field, where different values of the bit field correspond to different AI model types.

Alternatively or additionally, access apparatus 100 includes a sending unit 103. The sending unit 103 is configured to send the AI model type supported by the terminal to each of the one or more network devices.

Alternatively or additionally, the sending unit 103 sends the AI model type supported by the terminal to each of the one or more network devices through a second unicast signaling.

Alternatively or additionally, the second unicast signaling includes a terminal capability indication signaling or a radio resource control creation completion signaling.

Alternatively or additionally, the acquiring unit 101 is further configured to:

determine, before the sending unit 103 sends the AI model type supported by the terminal to each of the one or more network devices, that a request signaling sent by the network device is received. The request signaling is configured to request the acquisition of the AI model type supported by the terminal.

Alternatively or additionally, the acquiring unit 101 is further configured to:

send, through a notification signaling, the AI model type supported by the terminal to each of the one or more network devices. The notification signaling is configured to indicate the AI model type supported by the terminal.

Alternatively or additionally, the request signaling includes a terminal information request signaling, and the notification signaling includes a terminal information response signaling.

Alternatively or additionally, the sending unit 103 is further configured to send AI capability information to each of the one or more network devices. The AI capability information indicates that the terminal can support one or more AI models.

Figures 9, 10:
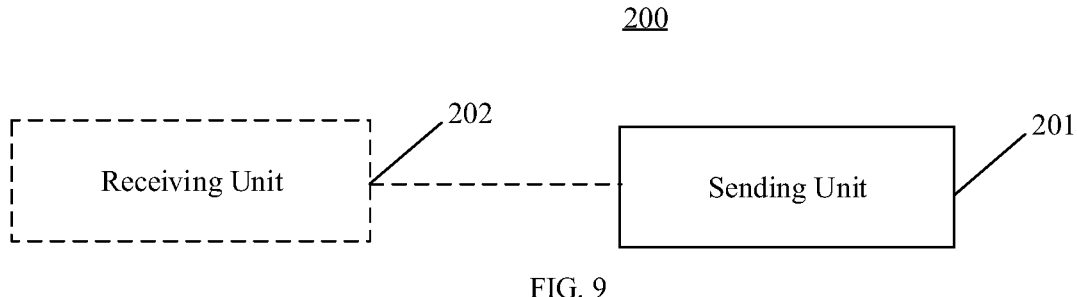
FIG. 9 illustrates a block diagram of an access apparatus according to an example.
FIG. 10 illustrates a block diagram of an apparatus for access according to an example.

FIG. 9 illustrates a block diagram of an access apparatus according to an example. As illustrated in FIG. 9, the access apparatus 200 includes a sending unit 201.

The sending unit 201 is configured to send an AI model type supported by a network device.

Alternatively or additionally, the sending unit 201 broadcasts, in system information, the AI model type supported by the network device.

Alternatively or additionally, the sending unit 201 sends, through a first unicast signaling, the AI model type supported by the network device.

Alternatively or additionally, the first unicast signaling includes a radio resource control reconfiguration signaling.

Alternatively or additionally, the AI model type is represented by an integer value. Different integer values correspond to different AI model types.

Alternatively or additionally, the AI model type is represented by a value of a bit field. Different values of the bit field correspond to different AI model types.

Alternatively or additionally, the access apparatus 200 further includes a receiving unit 202. The receiving unit 202 is configured to receive an AI model type supported by a terminal.

Alternatively or additionally, the receiving unit 202 receives, through a second unicast signaling, the AI model type supported by the terminal.

Alternatively or additionally, the second unicast signaling includes a terminal capability indication signaling or a radio resource control creation completion signaling.

Alternatively or additionally, the sending unit 201 is configured to send a request signaling before the receiving unit 202 receives the AI model type supported by the terminal. The request signaling is configured to request the acquisition of the AI model type supported by the terminal.

Alternatively or additionally, the receiving unit 202 receives, through a notification signaling, the AI model type supported by the terminal. The notification signaling is configured to indicate the AI model type supported by the terminal.

Alternatively or additionally, the request signaling includes a terminal information request signaling, and the notification signaling includes a terminal information response signaling.

Alternatively or additionally, the receiving unit 202 is further configured to receive AI capability information. The AI capability information indicates that the terminal can support one or more AI models.

Alternatively or additionally, the sending unit 201 is configured to configure an AI model type that matches the AI model type supported by the terminal as the AI model type supported by the network device.

Regarding the apparatuses in the above examples, the specific ways each module performs its operations have been described in detail in the related method examples, and will not be repeated here.

FIG. 10 illustrates a block diagram of an apparatus 800 for access, according to an example. The apparatus 800 may be a mobile phone, a computer, a digital broadcasting terminal, a messaging device, a game console, a tablet device, a medical device, a fitness device, a personal digital assistant, and the like.

As illustrated in FIG. 10, the apparatus 800 may include one or more the following components: a processing component 802, a memory 804, a power supply component 806, a multimedia component 808, an audio component 810, an input/output (I/O) interface 812, a sensor component 814, and a communication component 816.

The processing component 802 generally controls the overall operations of the apparatus 800, such as operations associated with display, phone calls, data communications, camera operations, and recording operations. The processing element 802 may include one or more processors 820 to execute instructions to complete all or part of the steps of the above methods. In addition, the processing component 802 may include one or more modules that facilitate the interaction between the processing component 802 and other components. For example, the processing component 802 may include a multimedia module to facilitate the interaction between the multimedia component 808 and the processing component 802.

The memory 804 is configured to store various types of data to support the operations of the apparatus 800. Examples of such data include instructions for any application or method operated on the apparatus 800, contact data, phonebook data, messages, pictures, videos, etc. The memory 804 may be implemented by any volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power supply component 806 provides power to various components of the apparatus 800. The power supply component 806 may include a power management system, one or more power supplies, and other components associated with generating, managing, and distributing power for the apparatus 800.

The multimedia component 808 includes a screen providing an output interface between the apparatus 800 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may sense a boundary of a touch or swipe, and also sense a lasting time and a pressure associated with the touch or swipe. In some examples, the multimedia component 808 includes a front camera and/or a rear camera. The front camera and/or rear camera may receive external multimedia data when the apparatus 800 is in an operating mode, such as a photographing mode or a video mode. Each front camera and rear camera may be a fixed optical lens system or have focal length and optical zooming capability.

The audio component 810 is configured to output and/or input an audio signal. For example, the audio component 810 includes a microphone (MIC) configured to receive an external audio signal when the apparatus 800 is in an operating mode, such as a call mode, a recording mode, and a voice recognition mode. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, buttons, or the like. These buttons may include, but are not limited to, a home button, a volume button, a start button, and a lock button.

The sensor component 814 includes one or more sensors to provide the apparatus 800 with status assessments in various aspects. For example, the sensor component 814 may detect an open/closed state of the apparatus 800 and a relative positioning of components such as the display and keypad of the apparatus 800, and the sensor component 814 may also detect a change in position of the apparatus 800 or a component of the apparatus 800, the presence or absence of user contact with the apparatus 800, orientation or acceleration/deceleration of the apparatus 800, and temperature change of the apparatus 800. The sensor component 814 may include a proximity sensor configured to detect the presence of a nearby object without any physical contact. The sensor component 814 may include an optical sensor, such as a Complementary Metal-Oxide-Semiconductor (CMOS) or Charged Coupled Device (CCD) image sensor used in imaging applications. In some examples, the sensor component 814 may also include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G, 3G, or a combination thereof. In an example, the communication component 816 receives broadcast signals or broadcast related information from an external broadcast management system via a broadcast channel. In an example, the communication component 816 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology, and other technologies.

In one or more examples, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above methods.

In one or more examples, a non-transitory computer-readable storage medium is also provided, including instructions, such as the memory 804, including instructions. The above instructions may be executed by the one or more processors 820 of the apparatus 800 to complete the above methods. For example, the non-transitory computer-readable storage medium may be a read-only memory (ROM), a random access memory (RAM), a CD-ROM, a magnetic tape, a floppy disk, an optical data storage device, and the like.

Figure 11:
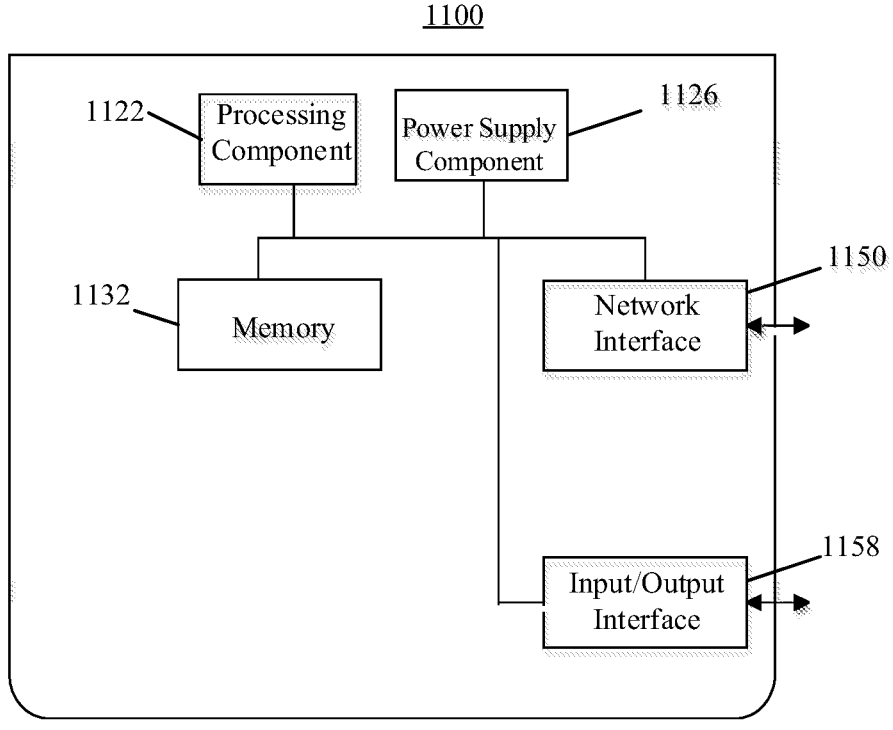
FIG. 11 illustrates a block diagram of an apparatus for access according to an example.

FIG. 11 illustrates a block diagram of an apparatus 1100 for access according to an example. For example, the apparatus 1100 may be provided as a network device, such as a base station. As illustrated in FIG. 11, the apparatus 1100 includes a processing component 1122, which further includes one or more processors, and a memory resource represented by a memory 1132, which is used to store instructions that may be executed by the processing component 1122, such as application programs. The application programs stored in the memory 1132 may include one or more modules, each of which corresponds to a set of instructions. In addition, the processing component 1122 is configured to execute instructions to perform the above methods.

The apparatus 1100 may also include a power supply component 426 configured to perform power management for the apparatus 1100, a wired or wireless network interface 1150 configured to connect the apparatus 1100 to a network, and an input/output (I/O) interface 1158. The apparatus 1100 may operate based on an operating system stored in the memory 1132, such as Windows Server™, Mac OS X™, Unix™, Linux™, FreeBSD™, or the like.

In one or more examples, a non-transitory computer-readable storage medium is also provided, such as the memory 1132, including instructions. The above instructions may be executed by the processing component 1122 of the apparatus 1100 to complete the above methods. For example, the non-transitory computer-readable storage medium may be a read-only memory (ROM), a random access memory (RAM), a CD-ROM, a magnetic tape, a floppy disk, an optical data storage device, and the like.

The technical solutions provided by the embodiments of the present disclosure may include the following beneficial effects. A terminal with an AI capability selects, according to an AI model type supported by each of one or more network devices, a network device that corresponds to the AI model type matching an AI model type supported by the terminal for access, which enables the terminal with the AI capability to select a wireless network matching the AI capability of the terminal itself for access, thereby improving a utilizing efficiency of the AI capabilities of the terminal and the network device.

It should be further understood that the term "plurality" in the present disclosure refers to two or more, and other quantifiers are similar. The term "and/or" describes the association relationships between associated objects, indicating that there may be three types of relationships. For example, A and/or B means that A exists alone, A and B exist at the same time, and B exists alone. The character "/" generally indicates that the associated objects before and after are in an "or" relationship. The singular forms "a", "said", and "the" are also intended to include plurality, unless indicated otherwise in the context.

It should be further understood that the terms "first", "second", etc., describe various information, but such information should not be limited to these terms. These terms are only used to distinguish information of the same category with each other, without indicating a specific order or an importance. In fact, the expressions such as "first" and "second" may be used interchangeably. For example, without departing from the scope of the present disclosure, first information may be referred to as second information; and similarly, second information may also be referred to as first information.

It should be further understood that although being described in a specific order in the drawings, the operations in the examples of the present disclosure should not be understood as requiring these operations to be performed in the specific order or in a serial order as shown, or requiring the operations to be completely performed as shown to get a desired result. In certain circumstances, multitasking and parallel processing may be advantageous.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples herein are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof.

The invention claimed is:

1. An access method, performed by a terminal, comprising:

determining that a terminal information request signaling sent by each of one or more network devices is received, wherein the terminal information request signaling is configured to request to acquire a second AI model type supported by the terminal;

sending, through a terminal information response signaling, the second AI model type supported by the terminal to each of the one or more network devices, wherein the second AI model type supported by the terminal is used for the network device to configure an AI model type that match the second AI model type supported by the terminal as a first AI model type supported by the network device, and wherein the terminal information response signaling is configured to indicate the second AI model type supported by the terminal;

acquiring the first AI model type supported by each of the one or more network devices through system information broadcast by the network device, wherein the first AI model type comprises at least one of an actual AI model type supported by the network device, an AI training model supported by the network device, or an AI inference model type supported by the network device; and selecting, according to the first AI model type supported by each of the one or more network devices, a network device that corresponds to the first AI model type matching a second AI model type supported by the terminal for access.

2. The access method according to claim 1, further comprising:

acquiring the first AI model type supported by each of the one or more network devices through a first unicast signaling.

3. The access method according to claim 2, wherein the first unicast signaling comprises a radio resource control reconfiguration signaling.

4. The access method according to claim 1, wherein the first AI model type is represented by an integer value, wherein different integer values correspond to different first AI model types; or wherein the first AI model type is represented by a value of a bit field, wherein different values of the bit field correspond to different first AI model types.

5. The access method according to claim 1, wherein sending the second AI model type supported by the terminal to each of the one or more network devices comprises:

sending the second AI model type supported by the terminal to each of the one or more network devices through a second unicast signaling, wherein the second unicast signaling comprises a terminal capability indication signaling or a radio resource control creation completion signaling.

6. The access method according to claim 1, further comprising:

sending AI capability information to each of the one or more network devices, wherein the AI capability information indicates that the terminal has a capability of supporting one or more AI models.

7. An access method, performed by a network device, the method comprising:

sending a terminal information request signaling, wherein the terminal information request signaling is configured to request to acquire a second AI model type supported by a terminal;

receiving, through a terminal information response signaling, the second AI model type supported by the terminal, wherein the terminal information response signaling is configured to indicate the second AI model type supported by the terminal;

configuring an AI model type that match the second AI model type supported by the terminal as a first AI model type supported by the network device; and broadcasting, in system information, the first AI model type supported by the network device, wherein the first AI model type comprises at least one of an actual AI model type supported by the network device, an AI training model supported by the network device, or an AI inference model type supported by the network device.

8. The access method according to claim 7, further comprising:

sending, through a first unicast signaling, the first AI model type supported by the network device.

9. The access method according to claim 8, wherein the first unicast signaling comprises a radio resource control reconfiguration signaling.

10. The access method according to claim 7, wherein the first AI model type is represented by an integer value, wherein different integer values correspond to different first AI model types; or wherein the first AI model type is represented by a value of a bit field, wherein different values of the bit field correspond to different first AI model types.

11. The access method according to claim 7, wherein receiving the second AI model type supported by the terminal comprises:

receiving, through a second unicast signaling, the second AI model type supported by the terminal, wherein the second unicast signaling comprises a terminal capability indication signaling or a radio resource control creation completion signaling.

12. The access method according to claim 7, further comprising:

receiving AI capability information, wherein the AI capability information indicates that the terminal has a capability of supporting one or more AI models.

13. An access apparatus, being applicable to a terminal, comprising:

one or more processors; and a memory for storing instructions executable by the one or more processors;

wherein the one or more processors are configured to:

determine that a terminal information request signaling sent by each of one or more network devices is received, wherein the terminal information request signaling is configured to request to acquire a second AI model type supported by the terminal;

send, through a terminal information response signaling, the second AI model type supported by the terminal to each of the one or more network devices, wherein the second AI model type supported by the terminal is used for the network device to configure an AI model type that match the second AI model type supported by the terminal as a first AI model type supported by the network device, and wherein the terminal information response signaling is configured to indicate the second AI model type supported by the terminal;

acquire a first AI model type supported by each of the one or more network devices through system information broadcast by the network device, wherein the first AI model type comprises at least one of an actual AI model type supported by the network device, an AI training model supported by the network device, or an AI inference model type supported by the network device; and select, according to the first AI model type supported by each of the one or more network devices, a network device that corresponds to the first AI model type matching a second AI model type supported by the terminal for access.

14. An access apparatus, being applicable to a network device, comprising:

one or more processors; and a memory for storing instructions executable by the one or more processors, wherein the one or more processors are configured to perform the access method according to claim 7.

* * * * *